United States Patent Office 3,655,815
Patented Apr. 11, 1972

3,655,815
THROMBORESISTANT ARTICLES CONTAINING EPOXY RESINS AND POLYETHYLENEOXIDE-POLYPROPYLENE OXIDE BLOCK COPOLYMERS
Ival O. Salyer, Dayton, and Albert J. Blardinelli, Kettering, Ohio, assignors to the United States of America as represented by the Secretary, Department of Health, Education, and Welfare
No Drawing. Filed May 20, 1970, Ser. No. 39,858
Int. Cl. C08g 45/00
U.S. Cl. 260—830 R
6 Claims

ABSTRACT OF THE DISCLOSURE

Articles (includes containers, conduits, devices or materials) for handling (includes containing, transporting or contacting) blood and reducing clotting comprising a mixture of an epoxy resin; with from about 0.5 to 20% by weight based on said resin of a thromboresistant polymer additive which is a polyethylene glycol, a polypropylene glycol or a block copolymer of the structure

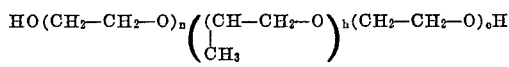

wherein $a$, $b$ and $c$ are each at least 1 and represent the number of moles of these groups, and the molecular weight of the polymer additive is in the range of about 500 to 15,000; and, an epoxy resin curing agent, said mixture having been cured and formed to make said articles. The articles described in the previous sentence have improved nonthrombogenic (thromboresistant) properties as compared to those made from conventional epoxy resins.

The invention described herein was made in the course of, or under, a contract with the Department of Health, Education and Welfare.

BACKGROUND OF THE INVENTION

The invention relates to articles useful in handling blood and reducing clotting as compared to articles made from conventional epoxy resins.

It is known in the prior art that the addition of Pluronic F–68 to the blood of both dogs and humans extends the safe time on a heart-lung machine; i.e. the amount of time the dog or human can be kept on the machine, and a dog's blood is much more susceptible to damage on the machine than human's (Heart Research Newsletter, vol. XIII, No. 2, Spring 1968).

A method has now been found to use Pluronic F–68 and like materials to make articles having improved thromboresistant properties as compared to conventional epoxy resins, i.e. articles such as artificial blood vessels, artificial organs such as artificial hearts, cannulas, connecting tubing and some surface areas exposed to blood in machines such as heart-lung machines, artificial kidneys and the like.

SUMMARY OF THE INVENTION

Articles (includes containers, conduits, devices or materials) for handling (includes containing, transporting or contacting) blood and reducing clotting comprising a mixture of an epoxy resin; with from about 0.5 to 20%, preferably 1 to 10%, by weight based on said resin of thromboresistant polymer additive which is a polyethylene glycol, a polypropylene glycol or a block copolymer of the structure

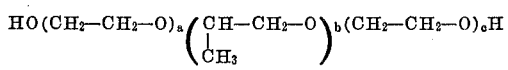

wherein $a$, $b$ and $c$ are each at least 1 and represent the number of moles of these groups, preferably the number of $a+c$ group on a weight basis constitute about 20 to 80% of the block copolymer with the balance being the $b$ groups, and the molecular weight of the polymer additive is in the range of about 500 to 15,000; and, an epoxy resin curing agent, said mixture having been cured and formed to make said articles. The articles described in the previous paragraph have improved thromboresistant properties as compared to those made from conventional epoxy resins.

Polyethylene glycols useful in making the containers or conduits of the invention are obtainable commercially, e.g. one source are Carbowax polymers marketed by Union Carbide Chemicals Company. The Carbowax polymers are described in detail in 1960 trade literature published by this company and are of the general formula $HO(C_2H_4O)_nH$, $n$ representing the average number of oxyethylene groups. The Carbowax polymers available commercially vary from about 200 to 6000 molecular weight; however, this type of polymer can be made by methods well known in the art outside this range.

Polypropylene glycols are also available commercially from Union Carbide Chemicals and are described in 1967 trade literature entitled "Physical Properties," page 10. These polymers are of the formula

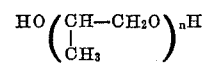

wherein $n$ averages 2 to 34 and have molecular weights from about 400 to 2100. Molecular weights outside those commercially available can be made by methods well known in the art.

The block copolymers are available commercially from the Wyandotte Chemicals Corporation and are described in trade literature of this company entitled "The Pluronic Grid," 6th edition. These materials are called Pluronic by this company and they are prepared by adding propylene oxide to the two hydroxyl groups of propylene glycol to give a polypropylene glycol then adding ethylene oxide to both ends of the polypropylene glycol to give the desired copolymers of the formula

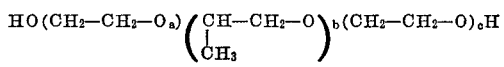

wherein $a$, $b$ and $c$ are defined hereinabove.

Epoxy resins are polymeric materials having terminal epoxy groups. These materials are well known commercially and are applied in protective coatings, structural plastics and adhesives. These resins are illustrated in Example 1 below wherein D.E.R. 732 of the formula

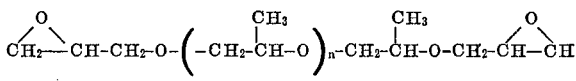

when cured gives a flexible structure; whereas, Epon 820 of the formula

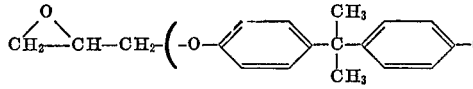

when cured gives a rigid structure. Mixtures of the flexible and rigid type epoxy resin when cured give structures having intermediate rigidity as compared to structures made only from D.E.R. 732 or Epon 820. These two epoxy resins are typical of those in the flexible and rigid category which are presently commercially available. A particularly good text on epoxy resins is "Handbook of Epoxy Resins" by Lee and Neville (1967), McGraw-Hill publisher. For the purposes of this patent application epoxy resins are defined as in this handbook, pages 1–2, except the cured resins are excluded, as follows: an *epoxy resin* is any molecule containing more than one α-epoxy group (whether situated internally, terminally, or on cyclic structures) capable of being converted to a useful thermoset form.

Any epoxy curing agent can be used to make the cured epoxy articles of this invention, and there are a large number of different types disclosed in the Handbook, pages 5–1 through 5–29. Both Lewis acids and Lewis bases as well as other compounds having active hydrogens can be used as curing agents, e.g. basic curing agents which are Lewis bases, inorganic bases, primary and secondary amines, and amides; and, acid curing agents which are

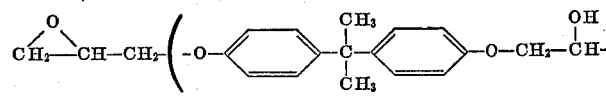

carboxylic acid anhydrides, dibasic organic acids, phenols, and Lewis acids. The amount of each curing agent to use will depend upon the particular curing agent and its mechanism of curing as well as the particular epoxy used. Some curing agents are catalytic in action so less is required while others actually become a part of the cured resin and more is needed, but this is all described in detail in the Handbook to the extent that one skilled in the art can easily determine the amount of curing agent needed for any epoxy. Therefore, for the purposes of this application it is sufficient to say that a sufficient amount is used to cure the resin to the desired solid structure. Curing temperatures and times of curing will vary with epoxy resins and curing agents, but these conditions are well known and it is enough to say that the resin is cured for a sufficient time and at a sufficient temperature to obtain the desired solid structure—see the Handbook.

Diluents or solvents can be used for the epoxy resin or for nonthrombogenic additive, e.g. in Example 1 it is seen that the Pluronic was dissolved in alcohol before being added to the epoxy resin, but solvents or diluents are not necessary. If any of the materials are solid they can be heated to melt them, then be mixed together and the curing agent added. In Example 1 the alcohol was removed before curing so was not trapped in the cured resin, but sometimes a diluent such as xylene may be left in to be entrapped in the cured resin, Handbook, page 13–2, the first paragraph. Solvents for epoxy resins are described in the Handbook, pages 24–29 to 24–33.

Pigment and extenders, fillers, plasticizers or any other material normally added to epoxy resins can also be added, if desired, and these are described in detail in the Handbook.

The articles, containers or conduits can be formed by any of the well known methods for forming plastics and especially cured epoxy resins such as moulding, machining, extruding, coating, blowing, casting, etc. One method used is to coat a solid water soluble material of the external shape that is desired with nonthrombogenic epoxy resin of the invention and cure the resin, then dissolve out the water soluble material to give the article of desired shape.

DESCRIPTION OF THE PREFERRED EMBODIMENTS

The invention is further illustrated by, but not limited to the following examples.

EXAMPLE 1

A mixture of 20.0 g. of D.E.R. 732 and 20.0 g. of Epon 820 were heated with stirring to 50°–60° C., and 2.0 g. (5% by weight) of Pluronic F–68 dissolved in 10 ml. of 95% ethanol was added with stirring. The ethanol and water were removed at 50°–60° C. under vacuum, the liquid residue mixture was cooled to 28° C., 2.7 g. (6.8 phr.) of diethylenetriamine curing agent was well mixed in, molds were filled and the samples cured at 50° C. for 19 hours.

D.E.R. (Dow epoxy resin) 732 is a diglycidyl ether of propylene glycol having the structure:

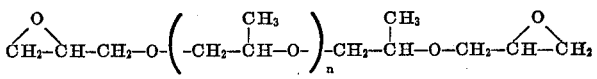

wherein n represents the average number of these groups in the resin and when cured provides a flexible structure. The molecular weight of D.E.R. 732 is in the range of about 610–670.

Epon 820 (Shell epoxy resin) is a diglycidyl ether of bisphenol A and has the structure:

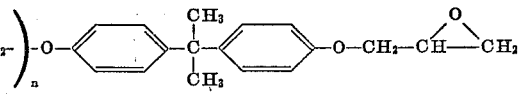

wherein n represents the average number of the group in the polymer and when the resin is cured it gives a rigid structure. The molecular weight of Epon 820 is in the range of about 360 to 390. Epon 820 has in it about 2–5% of phenyl glycidyl ether (a monoepoxide) which reduces viscosity. Epon 828 has the same polymer structure as Epon 820 but does not contain the phenyl glycidyl ether diluent. Of course Epon 828 could have been used in Example 1 instead of Epon 820.

Pluronic F–68 (a nonionic detergent from the Wyandotte Chemical Company) is a copolymer of propylene oxide and ethylene oxide in 20:80 weight ratio, respectively, having a molecular weight of about 8500 and the following structure:

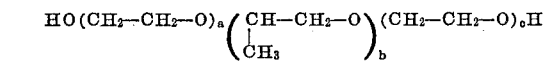

Pluronics generally including the specific one named above are described in a Wyandotte sales brochure entitled "The Pluronic Grid," 6th edition.

Example 2

The molded cured polymer of Example I was subjected to in vivo testing the dogs to determine its thromboresistance as follows: The in vivo test used was the inferior vena cava ring implant test. The rings were 10 mm. long with an 8 mm. O.D. and 7 mm. I.D. and they had beveled or streamlined internal leading and trailing edges. The rings were implanted in the inferior vena cava of the dog through a right thoracotomy during nembutal anesthesia. The rings were placed through a right atriotomy into the cava and then secured in place with a ligature. Good apposition of the venous wall against the ring was achieved with a fabric wrap on the outside of the vena cava. All materials were initially subjected to a two-hour ring implant test and if the materials appeared to have no more than minimal thrombus at the end of this time, then additional rings were implanted in other animals for two weeks and this was considered the chronic test. No animal was used more than once for a caval implant.

In the 2-week (chronic test) of the cured polymer of Example 1, all three rings were clot-free after two weeks showing excellent thromboresistance for this polymer; whereas, the cured epoxy resin without the Pluronic F–68 will not pass the two-hour test and so is not subjected to the two-week (chronic) test.

Although the invention has been described in terms of specified embodiments which are set forth in detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What we claim is:

1. A thromboresistant article for handling blood comprising a mixture of an epoxy resin; with from about 0.5 to 20% by weight based on said resin of a thromboresistant polymer additive which is a block copolymer of the structure

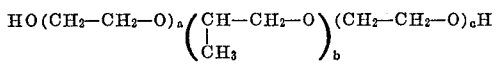

wherein $a$, $b$ and $c$ are each at least 1 and represent the number of moles of these groups, and the molecular weight of the polymer additive is in the range of about 500 to 15,000; and, an epoxy resin curing agent, said mixture having been cured and formed to make said article.

2. An article of claim 1 wherein the ratio of $a+c$ groups to $b$ groups is in the range of about 20:80 to 80:20 by weight, respectively.

3. An article of claim 2 wherein the ratio of $a+c$ groups to $b$ groups is about 80:20 by weight, respectively, the average molecular weight of the copolymer is about 8500, said epoxy resin is about an equal mixture of

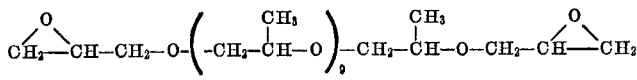

and

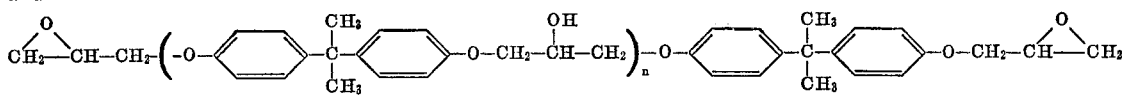

diluted with 2-5% phenylglycidyl ether, and said curing agent is diethylenetriamine.

4. A method for handling blood to reduce clotting comprising contacting blood with a thromboresistant article comprising a mixture of an epoxy resin; from about 0.5 to 20% by weight based on said resin of a thromboresistant polymer additive which is a polyethylene glycol, a polypropylene glycol or a block copolymer of the structure

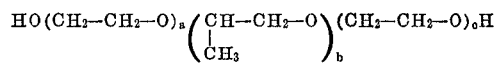

wherein $a$, $b$ and $c$ are each at least 1 and represent the number of moles of these groups, and the molecular weight of the polymer additive is in the range of about 500 to 15,000; and an epoxy resin curing agent, said mixture having been cured and formed to make said article; and substantially limiting contact of said blood to contact with said thromboresistant article.

5. A method of claim 4 wherein the thromboresistant additive is the block copolymer and the ratio of $a+c$ groups to $b$ groups is in the range of about 20:80 to 80:20 by weight, respectively.

6. A method of claim 5 wherein the ratio of $a+c$ groups to $b$ groups is about 80:20 by weight, respectively, the average molecular weight of the copolymer is about 8500, said epoxy resin is about an equal mixture of

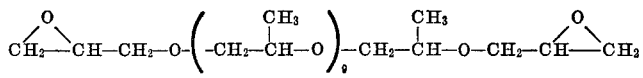

and

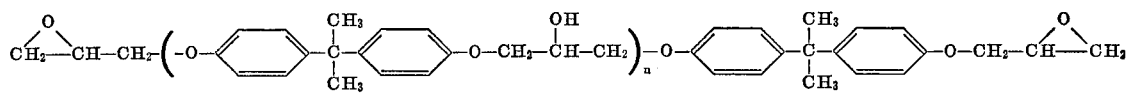

diluted with 2-5% phenylglycidyl ether, and said curing agent is diethylenetriamine.

References Cited

UNITED STATES PATENTS

| | | | |
|---|---|---|---|
| 2,914,490 | 11/1959 | Wheelock | 260—2 Ep |
| 2,731,444 | 1/1956 | Greenlee | 260—47 EpC |
| 2,935,488 | 5/1960 | Phillips | 260—830 R |
| 3,379,791 | 4/1968 | Larson | 260—830 R |
| 3,475,358 | 10/1969 | Bixler | 260—17.4 |
| 3,514,438 | 5/1970 | Bixler | 260—95 |

PAUL LIEBERMAN, Primary Examiner

U.S. Cl. X.R.

23—258.5